United States Patent
Kim et al.

(10) Patent No.: US 8,854,460 B2
(45) Date of Patent: Oct. 7, 2014

(54) IMAGE PROVIDING APPARATUS, IMAGE DISPLAYING APPARATUS, IMAGE TRANSMITTING SYSTEM AND IMAGE TRANSMITTING METHOD USING THE SAME

(75) Inventors: Jong-myoung Kim, Yongin-si (KR); Hyun-chul Sim, Seoul (KR)

(73) Assignee: Samsung Techwin Co., Ltd., Suwon-Si (KR)

( * ) Notice: Subject to any disclaimer, the term of this patent is extended or adjusted under 35 U.S.C. 154(b) by 1059 days.

(21) Appl. No.: 12/424,917

(22) Filed: Apr. 16, 2009

(65) Prior Publication Data

US 2010/0033569 A1 Feb. 11, 2010

(51) Int. Cl.
| | |
|---|---|
| H04N 7/18 | (2006.01) |
| H04N 5/76 | (2006.01) |
| H04N 7/173 | (2011.01) |
| H04N 21/462 | (2011.01) |
| H04N 21/4728 | (2011.01) |
| H04N 21/258 | (2011.01) |
| H04N 21/2343 | (2011.01) |
| H04N 21/214 | (2011.01) |

(52) U.S. Cl.
CPC ....... *H04N 7/17318* (2013.01); *H04N 21/4621* (2013.01); *H04N 21/4728* (2013.01); *H04N 21/25816* (2013.01); *H04N 21/2343* (2013.01); *H04N 21/25875* (2013.01); *H04N 21/25825* (2013.01); *H04N 21/234363* (2013.01); *H04N 21/2143* (2013.01)
USPC ...................................... 348/143; 348/231.9

(58) Field of Classification Search
USPC ........................................................ 348/143
See application file for complete search history.

(56) References Cited

U.S. PATENT DOCUMENTS

| | | | |
|---|---|---|---|
| 6,981,045 B1 | 12/2005 | Brooks | |
| 7,920,177 B2 * | 4/2011 | Okabe | 348/231.9 |
| 2004/0073925 A1 | 4/2004 | Kinoshita | |
| 2006/0085534 A1 * | 4/2006 | Ralston et al. | 709/223 |
| 2006/0136972 A1 * | 6/2006 | Metzger et al. | 725/105 |
| 2006/0256376 A1 * | 11/2006 | Hirooka | 358/1.15 |
| 2007/0156925 A1 * | 7/2007 | Shigeta et al. | 709/246 |
| 2009/0138551 A1 * | 5/2009 | Hubbard | 709/203 |
| 2010/0026802 A1 * | 2/2010 | Titus et al. | 348/143 |
| 2010/0328461 A1 * | 12/2010 | Renkis | 348/143 |
| 2012/0191793 A1 * | 7/2012 | Jakobovits | 709/206 |

FOREIGN PATENT DOCUMENTS

| | | |
|---|---|---|
| EP | 1655962 A1 | 5/2006 |
| WO | 03091832 A2 | 11/2003 |
| WO | WO 2004036926 A2 | 4/2004 |

OTHER PUBLICATIONS

Extended European search report issued Aug. 26, 2011 by the European Patent Office in counterpart European Patent Application No. 09164135.7.
Communication, dated May 16, 2014, issued by the European Patent Office in counterpart European Patent Application No. 09 164 135.7.

\* cited by examiner

*Primary Examiner* — Andy Rao
*Assistant Examiner* — James Edwards
(74) *Attorney, Agent, or Firm* — Sughrue Mion, PLLC (57) ABSTRACT

An image providing apparatus, an image displaying apparatus, an image transmitting system and an image transmitting method thereof. The image providing apparatus includes a storage unit, a transceiver to receive transmission request information and a stored image, and a controller to process the image using extracted information. Accordingly, a waste of resource required for data processing at an external device is reduced and an image optimized for display is provided to the external device.

19 Claims, 5 Drawing Sheets

IMAGE PROVIDING APPARATUS, IMAGE DISPLAYING APPARATUS, IMAGE TRANSMITTING SYSTEM AND IMAGE TRANSMITTING METHOD USING THE SAME

CROSS-REFERENCE TO RELATED APPLICATIONS

This application claims all benefits accruing under 35 U.S.C. §119 of Korean Patent Application No. 2008-77814, filed on Aug. 8, 2008 in the Korean Intellectual Property Office, the disclosure of which is incorporated herein by reference.

BACKGROUND OF THE INVENTION

1. Field of the Invention

Aspects of the present invention relate to an image providing apparatus, an image displaying apparatus, an image transmitting system, and an image transmitting method thereof, and more particularly, to an image providing apparatus, an image displaying apparatus, and an image transmitting system, and an image transmitting method thereof, which use an image having a changed format.

2. Description of the Related Art

A video cassette recorder (VCR), which was used for video-recording in a surveillance camera, had low image quality and required frequent replacement of a tape. In order to improve these disadvantages, a digital video recorder (DVR) using a hard disk drive (HDD) or a digital video disk (DVD) has been developed and used instead of the VCR.

Since such a DVR uses a storage medium of a digital format, such as HDD and DVD, the DVR facilitates transmitting a stored image in addition to reproducing, editing, and searching a stored image. The DVR makes it possible to store or reproduce an image for a long time and also to wirelessly transmit a stored image to an external device and display it on a screen of the external device. These operations of the DVR are possible by compressing and expanding an image input from a camera. The image is compressed in a single format because the DVR uses a single encoder.

However, if the external device does not support the format of an image compressed by the DVR, the stored image is not viewable. In addition, the external device generally has a low data processing capability. Therefore, if the external device supports the format of a compressed image but it receives images from a plurality of DVRs using different encoders, the external device should decode images which are stored in their respective formats. This causes a load to the external device in processing the data.

SUMMARY OF THE INVENTION

Aspects of the present invention provide an image providing apparatus, an image displaying apparatus, an image transmitting system and an image transmitting method thereof, which transmits and receives an image optimized for display on an external device.

Additional aspects and/or advantages of the invention will be set forth in part in the description which follows and, in part, will be obvious from the description, or may be learned by practice of the invention.

According to an aspect of the present invention, an image providing apparatus is provided. The image providing apparatus includes a storage unit, a transceiver, and a controller. The storage unit stores format information multiple devices. The transceiver receives transmission request information for an image stored in a first device from a second device, and receives, from the first device, the image stored in the first device. The controller extracts format information of the second device based on the format information of the multiple devices and the transmission request information, and processes the image received from the first device using the extracted format information. The controller transmits the processed image to the second device, via the transceiver.

According to another aspect of the present invention, the first device may be a storage device to store an image photographed by at least one photographing apparatus.

According to another aspect of the present invention, the second device may be at least one portable display device to receive and display the processed image.

According to another aspect of the present invention, the transmission request information may include at least one of identification information of the second device, an ID, and a password.

According to another aspect of the present invention, the format information may include quality or property information of an image supported by at least one of the multiple devices.

According to another aspect of the present invention, the controller may process quality or property information of the image received from the first device so as to correspond to quality or property information of an image of the second device.

According to another aspect of the present invention, the controller may extract information about whether the second device has already been authenticated along with the format information, and if the second device has already been authenticated, the controller may process the image using identification information of the second device included in the transmission request information.

According to another aspect of the present invention, if the second device has not been authenticated, the controller may determine whether to authenticate the second device using at least one of an ID and a password included in the transmission request information, and if the second device has been authenticated, the controller may process the image using identification information of the second device included in the transmission request information.

According to another aspect of the present invention, the controller may transmit a UI for manipulating the processed image along with the processed image to the second device such that the processed image and the UI are concurrently displayed on a screen of the second device.

According to another aspect of the present invention, if a manipulation command input through the UI for the processed image is received, the controller may re-process the image to correspond so as to the manipulation command and transmit the image, via the transceiver.

According to another aspect of the present invention, a plurality of the first devices may be provided and the controller may control the first devices such that at least two of a plurality of images stored in the plurality of the first devices are processed and are concurrently displayed on the screen of the second device.

According to another aspect of the present invention, an image displaying apparatus to receive and display an image having a processed format is provided. The image displaying apparatus includes a transceiver and a controller. The transceiver transmits transmission request information for an image stored in an external device to a server and receives an image processed by the server based on the transmission request information. The controller controls the image displaying apparatus such that the processed image is displayed.

According to another aspect of the present invention, the transceiver may receive the processed image along with a UI for manipulating the processed image.

According to another aspect of the present invention, the image displaying apparatus may further include a user input unit to manipulate the UI, and, if a manipulation command for the UI is input through the user input unit, the transceiver may transmit the manipulation command to the server and receive an image re-processed according to the manipulation command.

According to another aspect of the present invention, the processed image may be processed such that quality or property information of an image stored in the external device coincides with quality or property information of an image supported by the image displaying apparatus.

According to another aspect of the present invention, the processed image may include an image combining at least two of the plurality of images stored in the plurality of external devices.

According to another aspect of the present invention, an image transmitting method is provided. The image transmitting method comprises receiving transmission request information from a second device for an image stored in a first device, receiving the image stored in the first device, and extracting format information of the second device based on the received transmission request information and format information pre-stored for each device. The image transmitting method may further include processing an image received from the first device based on the extracted format information, and transmitting the processed image to the second device.

According to another aspect of the present invention, the processing of the image may comprise processing quality or property information of an image received from the first device so as to correspond to format information of the second device.

According to another aspect of the present invention, the processing of the image may comprise extracting information about whether the second device has been already authenticated, along with the format information, and if the second device has already been authenticated, processing the image using identification information of the second device included in the transmission request information.

According to another aspect of the present invention, if the second device has not been already authenticated, the processing of the image may comprise determining whether to authenticate the second device using at least one of an ID and a password included in the transmission request information, and if the second device has been authenticated, processing the image using identification information of the second device included in the transmission request information.

According to another aspect of the present invention, the transmitting of the processed image may comprise transmitting the processed image along with a UI for manipulating the processed image to the second device such that the processed image and the UI are concurrently displayed on a screen of the second device.

According to another aspect of the present invention, the image transmitting method may further include, if a manipulation command input through the UI for the processed image is received, re-processing the image so as to correspond to the manipulation command and re-transmitting the image.

According to another aspect of the present invention, a plurality of the first devices may be provided, and the processing of the image may comprise processing at least two images stored in the plurality of the first devices and displaying the two images on a screen of the second device concurrently.

According to another aspect of the present invention, an image transmitting system is provided. The image transmitting system includes at least one first device to store an image photographed by at least one photographing apparatus, and a second device to transmit transmission request information for an image stored in the first device to receive the image stored in the at least one first device. The image transmitting system includes a server to extract format information of the second device based on the transmission request information and format information for each device if the transmission request information is received, to process the image received from the first device using the extracted format information, and to transmit the processed image to the second device.

According to another aspect of the present invention, if the transmission request information is received from the second device, the server may process the image in a format supported by the second device and transmit the image to the second device.

According to another aspect of the present invention, the format may include quality or property information of an image.

According to another aspect of the present invention, if a plurality of second devices transmit a transmission request concurrently, the server may process the stored image according to a predefined priority and wirelessly transmit the image.

Additional aspects and/or advantages of the invention will be set forth in part in the description which follows and, in part, will be obvious from the description, or may be learned by practice of the invention.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
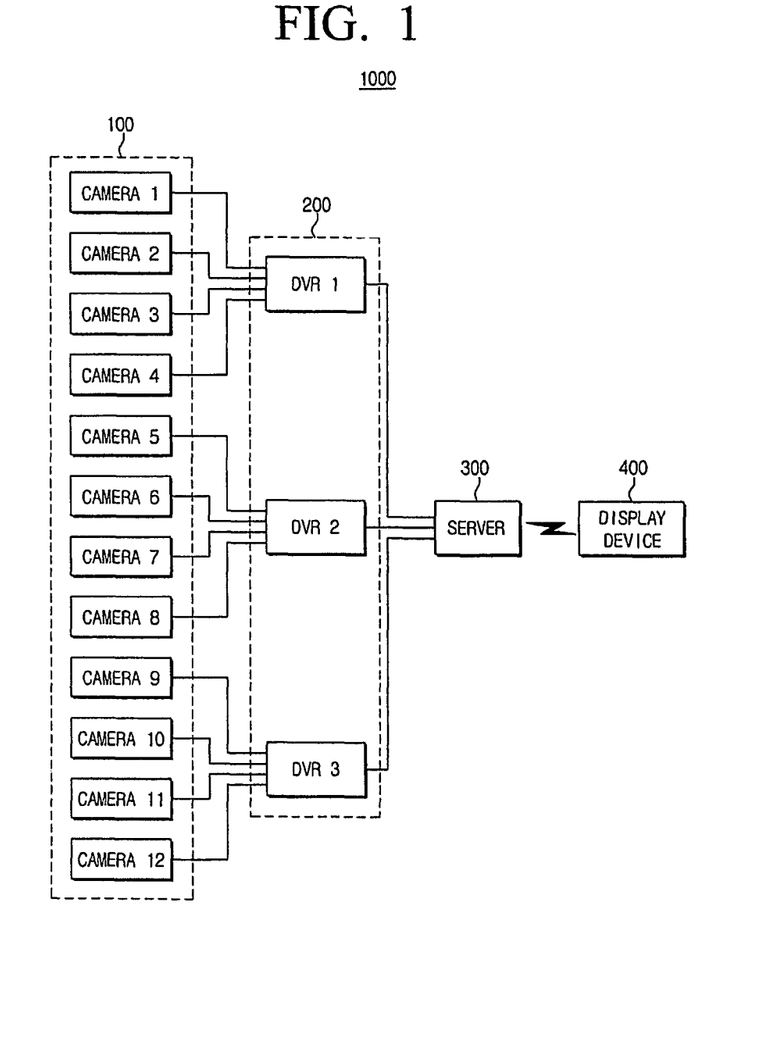
FIG. 1 is a block diagram illustrating an image transmitting system according to an example embodiment of the present invention.

FIG. 1 illustrates an image transmitting system according to an example embodiment of the present invention. The image transmitting system as shown in FIG. 1 converts a format of a photographed image, i.e., processes the image to be viewable by a user. The image transmitting system includes a plurality of cameras 100, a plurality of digital video recorders (DVRs) 200, a server 300, and a display device 400. According to other aspects of the present invention, the image transmitting system may include additional and/or different components. Similarly, the functionality of two or more of the above components may be integrated into a single unit.

The camera is a photographing apparatus for photographing an object in proximity to a viewing angle. The camera 100 photographs an object and transmits a photographed image to the DVR 200. A plurality of the cameras 100 may be connected a single DVR 200. For example, in FIG. 1, a set of four cameras (camera-1, camera-2, camera-3, and camera-4) is connected to a DVR (DVR-1), another set of four cameras (camera-5, camera-6, camera-7, and camera-8) is connected another DVR (DVR-2), and the other set of four cameras (camera-9, camera-10, camera-11, and camera-12) is connected to the other DVR (DVR-3).

The DVR 200 stores an image photographed by the camera 100. The DVR 200 compresses the image photographed by and transmitted from the camera 100 according to a compression method such as Moving Picture Experts Group (MPEG 2), MPEG4, H.264/AVC and stores the compressed image to a digital storage medium embedded therein, such as a hard disk drive (HDD).

The DVR-1 compresses images photographed by the camera-1, the camera-2, the camera-3, and the camera-4, and stores the compressed images. The DVR-2 compresses images photographed by the camera-5, the camera-6, the camera-7, and the camera-8 and stores, the compressed images. The DVR-3 compresses images photographed by the camera-9, the camera-10, the camera-11, and the camera-12, and stores the compressed images. The DVR 200 transmits the stored images to the server 300. The DVR 200 transmits images stored therein to the server 300 upon receiving a request for transmission for the stored images from the server 300.

The server 300 establishes a database for the images stored in the DVR 200, receives the images from the DVR 200, and transmits the images to the display device 400. If the server 300 wirelessly receives transmission request information from the display device 400, the server 300 performs an authentication procedure and then receives an image from the DVR 2000, and converts a format of the received image and transmits it to the display device 400. Although shown utilizing wireless connections, the DVR 200 may communicate with the server via a wired connection as well.

The transmission request information may be configured in a different way depending on whether the display device 400 has been authenticated. If the display device 400 has not been authenticated by the server, the transmission request information includes identification information, a ID, and a password of the display device 400.

The identification information identifies the display device 400, and may be, for example, a medium access control (MAC) address. The MAC address is used to specify a device which has transmitted transmission request information and the ID and the password are used to authenticate the display device 400. After the authentication procedure is completed, the server 300 transmits to the display device 400 a message indicating that authentication is completed, i.e., that access is allowed.

If the display device 400 has been already authenticated by the server 300, the transmission request information may include only the MAC address of the display device 400. Accordingly, the server 300 omits the unnecessary authentication procedure for an already authenticated device and specifies the device which has transmitted the transmission request information. Since the display device 400 has already been authenticated, the server 300 transmits to the display device 400 a message indicating that the display device 400 has been authenticated and access has been allowed.

If the display device 400 is authenticated, the server 300 transmits a transmission command for the image stored in the DVR 200 to the DVR 200. The DVR 200 transmits the image to the server 300 according to the transmission command received from the server 300.

The image transmitted to the server 300 is either an image photographed by any one of the plurality of cameras 100 or images photographed by the plurality of cameras 100. For example, the image transmitted to the server 300 may be images photographed by the camera-1, the camera-4, the camera-5 and the camera-10. The image transmitted to the server 300 is not necessarily an image stored in the same DVR 200. The image transmitted to the server 300 may be an image photographed by a pre-designated camera or an image photographed by a camera designated by the transmission request information transmitted from the display device 400.

The server 300 stores format information for each device. The format information is information that matches device names of all devices wirelessly communicable with the server 300 with formats supported by the respective devices or formats optimized for display on the respective devices. The format may refer to image quality or characteristic information resolution, and more particularly, may refer to a resolution, a compression method or a frame rate of the image. For example, with respect to the display device 400 having a title of 'LWK-123', the server 300 stores format information indicating that a resolution of an image should be 'CIF (352×288) ', a compression method be 'MPEG-4', and a frame rate be '30 FPS (Frame Per Second) to display an image on the display device 400.

The server 300 extracts pre-stored format information of the display device 400 using the MAC address of the display device 400 included in the transmission request information. The server 300 may also convert a format of an image received from the DVR 200 using the extracted format information and wirelessly transmit the image to the display device 400.

For example, if the display device 400 has a device name of 'LWK-123' and an image photographed by the camera-1 and stored in the DVR-1 is of a resolution of 'D1(720×480)', is of a compression method of 'MPEG-4', and of a frame rate of '30 FPS', the image photographed by the camera-1 and stored in the DVR-1 is not optimized for display on the display device 400 called 'LWK-123'. Particularly, in view of a resolution, the stored image is not optimized for display on the display device 400. Accordingly, the server 300 converts a resolution of the image photographed by the camera-1 and received from the DVR-1 from 'D1(720*480)' to 'CIF (352*288)' and wirelessly transmits the image to the display device 400.

If the server 300 converts a plurality of images to be suitable for a single display and wirelessly transmits the images to the display device 400, a resolution of the image stored in the DVR gets smaller. For example, the server 300 may receive images photographed by the camera-1 and the camera-4 and stored in the DVR-1, an image photographed by the camera-5 and stored in the DVR-2, and an image photographed by the camera-10 and stored in the DVR-3. The server 300 may convert the four images to 'QCIF (Quarter CIF)(176*144)' respectively, combine the images, and then wirelessly transmit the combined image to the display device 400.

The server 300 generates a user interface (UI) for manipulating the image having a changed format and transmits the generated UI along with the image having a changed format to the display device 400. The display device 400 allows a user to view the image stored in the DVR 200. The display device 400 wirelessly transmits transmission request information to the server 300 and wirelessly receives the image converted to have an optimal format for display on the display device 400.

The display device 400 wirelessly receives the image having a changed format along with the UI through which the image having a changed format is manipulated. In this case, if the UI displayed on the display device 400 is manipulated, a manipulation command for the UI is wirelessly transmitted to the server 300 and the server 300 re-processes the image in response to the manipulation command and re-transmits the image to the display device 400.

For example, the server 300 may change a format of an image photographed by the camera-1 and transmit the image along with the UI to the display device 400. If an image photographed by the camera-2 is requested to be transmitted as the UI displayed on the display device 400 is manipulated, a transmission request command for the image photographed by the camera-2 is wirelessly transmitted to the server 400. Accordingly, the server 300 converts the format of the image photographed by the camera-2 to a format optimized for display on the display device 400 and re-transmits the image to the display device 400. Thus, the external device having a low data processing capability, such as the display device 400, is free from a load of processing data, such as changing a format of the image.

Figure 2:
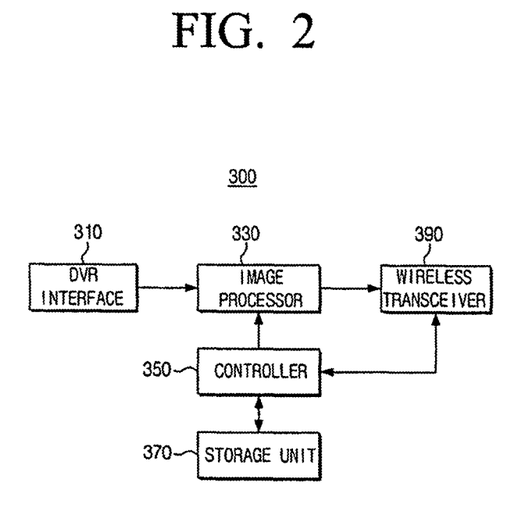
FIG. 2 is a block diagram illustrating a server according to an example embodiment of the present invention.

FIG. 2 illustrates the server 300 according to an example embodiment of the present invention. The server 300 includes a DVR interface 310, an image processor 330, a controller 350, a storage unit 370, and a wireless transceiver 390.

The DVR interface 310 is a connector for connecting the server and the DVR 200 in a wired or wireless manner. The server 300 transmit a transmission command for the image stored in the DVR 200 through the DVR interface 310 and the DVR 200 transmits the image stored therein to the server 300 through the DVR interface 310.

The image processor 330 converts a format of the image received from the DVR 200. The image processor 330 extracts format information about the display device 400 and converts the format of the image received from the DVR 200. The image processor 330 performs a signal processing of a video scaling to change a resolution and performs a signal processing of decoding and encoding to change a compression method and a frame rate.

The image processor 330 may also generate a UI to manipulate the image having a changed format, add the generated UI to the image, and transmit the image to the wire transceiver 390. For this purpose, the image processor 330 may include a codec (not shown), a scaler (not shown), and a UI generator (not shown).

The wireless transceiver 390 is a communication module that wirelessly communicates with an external device, such as the display device 400. The wireless transceiver 390 wirelessly receives transmission request information for the image stored in the DVR 200 from the display device 400, and wirelessly transmits the image changed in format by the image processor 330 to the display device 400.

The storage unit 370 stores format information for each device and an ID and a password to authenticate the display device 400. The storage unit 370 may be realized by, for example, a HDD or a DVD.

The controller 350 controls operations of the server 300. The controller 350 determines whether the display device 400 has been already authenticated or not using the MAC address included in the transmission request information received to the wireless transceiver 390. If the display device 400 has not been authenticated, the controller 350 compares the ID and the password included in the transmission request information with an ID and a password stored in the storage unit 370 to determine whether to authenticate the display device 400. If the display device 400 is authenticated, the controller 350 extracts format information of the display device 400 stored in the storage unit 370 using the MAC address included in the transmission request information, and controls the image processor 330 to convert a format of the image received from the DVR 200 according to the extracted format information.

The controller 350 controls the image processor 330 to generate a UI for manipulating the image changed in format and controls the wireless transceiver 390 to wirelessly transmit the image changed in format or the image to which the generated UI is added to the display device 400.

The controller 350 controls the image processor 330 and the wireless transceiver 390 to re-convert the image according to a manipulation command received via the wireless transceiver 390 and to re-transmit the image.

Figure 3:
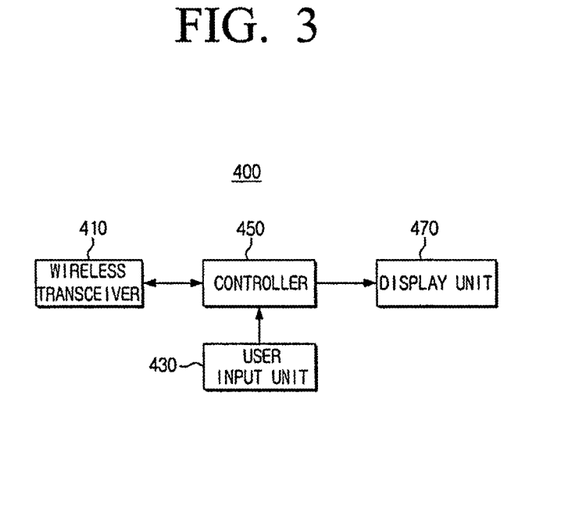
FIG. 3 is a block diagram illustrating a display device according to an example embodiment of the present invention.

FIG. 3 illustrates the display device 400 according to an example embodiment of the present invention. The display device 400 includes a wireless transceiver 410, a user input unit 430, a controller 450, and a display unit 470.

The wireless transceiver 410 is a communication module that wirelessly communicates with the server. The wireless transceiver 410 wirelessly transmits transmission request information for an image stored in the DVR 200 to the server 300 and receives an image changed in format by the server 300.

The user input unit 430 receives a user command to receive an image from the DVR 200 and transmit the input user command to the controller 450. The user input unit 430 may also receive an ID and a password from the user to be authenticated by the server 300. The user input unit 430 is used to manipulate the image changed in format and transmitted from the server 300. The user input unit 430 may be used to manipulate the UI transmitted along the image and to re-receive the image changed according to a manipulation command. The display unit 470 displays the image changed in format and transmitted from the server 300 under the control of the controller 450 along with the UI.

The controller 450 controls operations of the display device 400. The controller 450 controls the display device such that an ID and a password input through the user input unit 430 is included in transmission request information and the display device 400 is authenticated by the server through the ID and the password included in the transmission request information.

The controller 450 extracts an MAC address of the display device 400 such that the extracted MAC address is included in the transmission request information. The MAC address allows the server 300 to extract format information for each device of the display device 400. The controller 450 wirelessly transmits the transmission request information including the MAC address, the ID, and the password to the server 300 through the wireless transceiver 410, and displays the image changed in format and the UI which are received through the wireless transceiver 410 on the display unit 470.

The controller 450 transmits a user manipulation command input through the UI displayed on the display unit 470 to the server 300 through the wireless transceiver 410, receives an image re-converted by and re-transmitted from the server 300, and displays the image on the display unit 470. The user manipulation command may be received through the user input unit 430 or may be received through the display unit 470 having a touch screen function.

Figure 4:
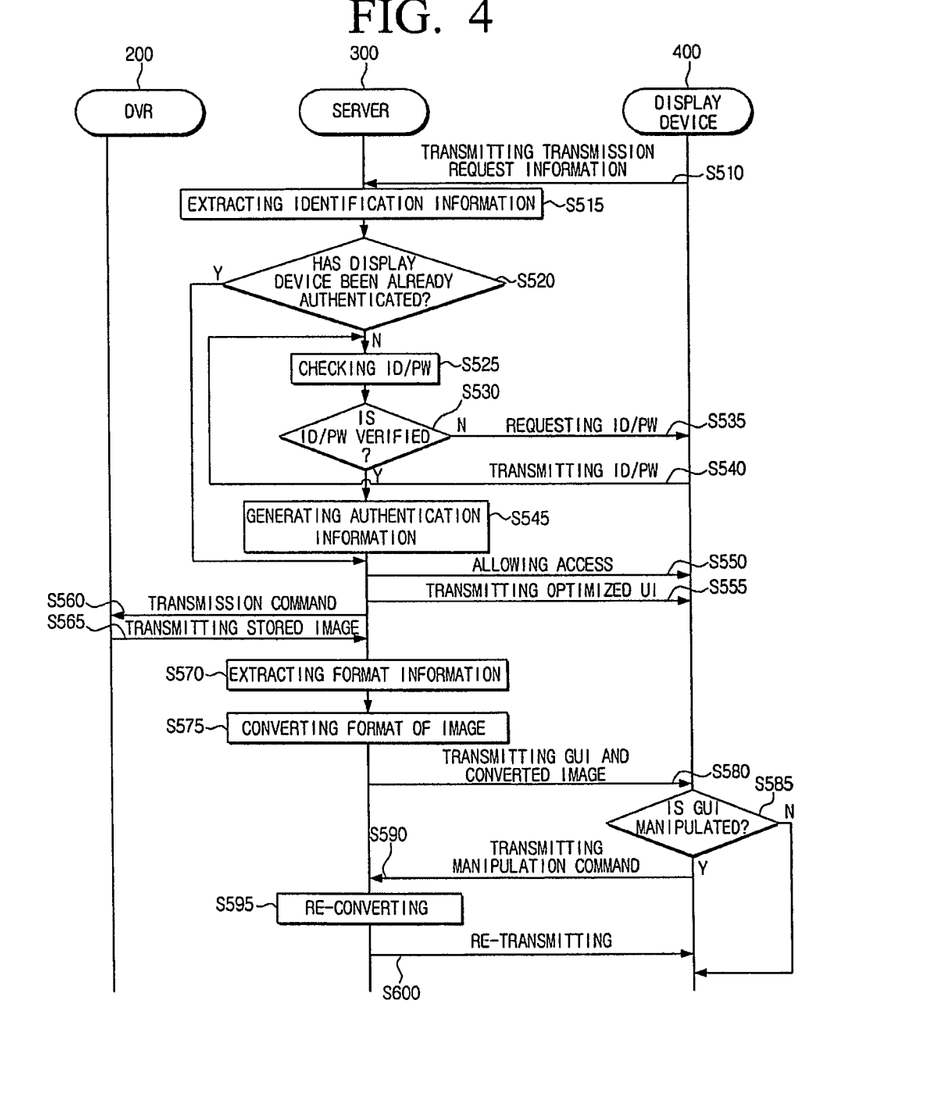
FIG. 4 is a flowchart illustrating a method for transmitting an image according to an example embodiment of the present invention.

FIG. 4 is a flowchart of an image transmitting process according to an example embodiment of the present invention. In this embodiment, a process of photographing an image using the camera 100 and storing it to the DVR 200 will be omitted for the sake of simplicity.

The display device 400 wirelessly transmits transmission request information to the server 300 at block S510. The server 300 extracts identification information from the received transmission request information at block S515. At block S520, the server 300 determines whether the display device 400 has been already authenticated based on the identification information of the display device 400 included in the transmission request information.

If the display device 400 has already been authenticated, the server 300 generates authentication information indicating that the display device 400 has already been authenticated and stores the authentication information at block S545, and wirelessly transmits a message indicating that access is allowed to the display device 400 at block S550. In accordance with the generation of and storing of the authentication information indicating that the display device 400 has been already authenticated, the server 300 determines that the display device 400 has been already authenticated when the display device 400 further transmits transmission request information.

However, if the display device 400 has not been authenticated, the server 300 checks an ID and a password included in the transmission request information at block S525, and determines whether the ID and the password are verified at block S530. If the ID and the password are verified, the server 300 generates authentication information indicating that the display device 400 is authenticated and stores the authentication information at block S545, and wirelessly transmits a message indicating that an access is allowed to the display device 400 at block S550.

If the ID and the password are not verified, the server 300 transmits a request message to request the display device 400 to re-transmit an ID and a password at block S535. If an ID and a password are transmitted from the display device 400 to the server 400 according to the request message at block S540, the server 300 re-checks the ID and the password included in the transmission request information transmitted from the display device 400 at block S525, and determines whether the ID and the password coincide with those stored in the server 300 at block S530. If the ID and the password are verified, the server 300 generates and store authentication information at block S545 and wirelessly transmits a message allowing an access to the display device 400 at block S550.

At block S555, the server 300 transmits an UI optimized for the display device 400 to the display device. The server 300 transmits a transmission command for an image stored in the DVR 200 to the DVR 200 at block S560, and the DVR 200 transmits an image photographed by the camera 100 and stored in the DVR 200 to the server 300 at block S565.

The server 300 extracts format information of the display device 400 using identification information of the display device 400 included in the transmission request information and format information for each device pre-stored in the server 300 at block S570.

The server 300 converts the format of the image transmitted from the DVR 200 using the extracted format information at block S575. At block S580, the server 300 wirelessly transmits the image having a changed format to the display device 400. Accordingly, the display device 400 receives the image which has been converted to have a format optimal for display and displays the image.

The display device 400 may re-receive an image which is re-changed according to a manipulation command by manipulating the UI. If the UI is manipulated, the display device 400 wirelessly transmits the manipulation command to the server 300 at block S590. If the manipulation command is received, the server 300 re-converts the image according to the manipulation command at block S595.

This re-converting process may be to re-convert the format of the image photographed by the same camera or to receive an image photographed by another camera. If the re-converting process is to achieve the latter, the re-converting process corresponds to transmitting a transmission command from the server 300 to the DVR 200 and transmitting the stored image from the DVR 200 to the server 300. The server 300 re-transmits the re-converted image to the display device 400.

In the above description, the image stored in the DVR 200 and the UI are separately transmitted. However, aspects of the present invention may also be applied to the case in which the image stored in the DVR 200 and the UI are transmitted simultaneously. As in the above embodiment, the UI is transmitted in advance in operation S555 and then the image is transmitted at block S580, but the image and the optimized UI may be transmitted simultaneously at block S580.

Figure 5:
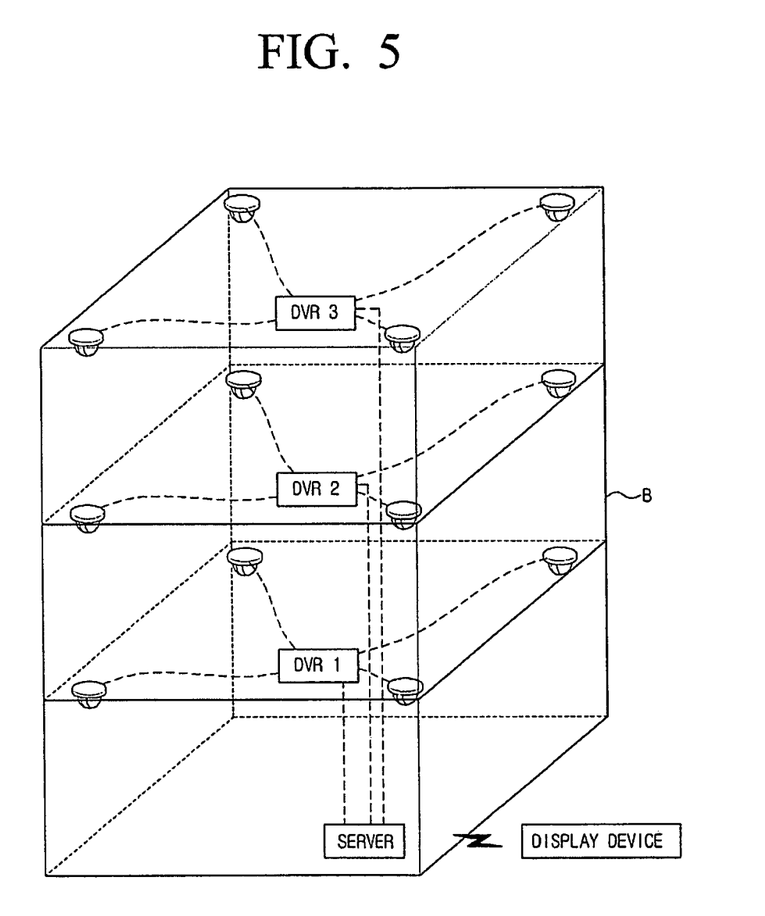
FIG. 5 is a surveillance system in a building to which an image transmitting system of the present invention is applicable.

FIG. 5 illustrates a surveillance system in a building as an example to which the image transmitting system according to the present invention is applicable. A surveillance camera 1, a surveillance camera 2, a surveillance camera 3, and a surveillance camera 4 are located on the first floor of the building B, and images photographed by the surveillance camera 1, the surveillance camera 3, the surveillance camera 3, and the surveillance camera 5 are stored to a DVR-1.

In addition, a surveillance camera 5, a surveillance camera 6, a surveillance camera 7, and a surveillance camera 8 are located on the second floor of the building B, and images photographed by the surveillance camera 5, the surveillance camera 6, the surveillance camera 7, and the surveillance camera 8 are stored to a DVR-2. Likewise, a surveillance camera 9, a surveillance camera 10, a surveillance camera 11, and a surveillance camera 12 are located on the third floor of the building B, and images photographed by the surveillance camera 9, the surveillance camera 10, the surveillance camera 11, and the surveillance camera 12 are stored to a DVR-3.

The DVR-1, the DVR-2, and the DVR-3 are connected to a server. The DVR-1 is located on the first floor of the building B, the DVR-2 on the second floor, and the DVR-3 on the third floor, and the server is located on the first floor of the building B. However, this is merely an example for the convenience of explanation; aspects of the present invention are also applicable to the case in which they are located on different floors.

The server is wireless-communicable with a display device located outside the building B. Accordingly, the display device 400 allows a user to view an image stored in the DVR-1, the DVR-2 or the DVR-3 through the server. The server converts the format of the image stored in the DVR-1, the DVR-2 or the DVR-3 to a format that is optimal for display on the display device located outside the building B, and transmits the converted image to the display device.

Accordingly, the external device does not waste resources required for data processing and is provided with an image optimized for display.

The user can also check an inner situation of the building B without entering the building B. The device can be previously set to be able to wirelessly communicate with the server check the inner situation of the building B through the server. Any display device that can be authenticated by an ID and a password can check the inner situation of the building B.

In the above embodiment, the four cameras are connected to one DVR and three DVRs are connected to one server. However, it is obvious to an ordinary skilled person in the related art that the technical idea of the present invention is not limited by the number of connected devices.

Although a resolution, a compression method, and a frame rate are mentioned as format information, the format information is not limited to these. For example, a compression rate and a bit rate may also be used as format information.

As described above, the display device 400 is authenticated and format information for each device is extracted by the MAC address included in the transmission request information. However, aspects of the present invention are applicable to the case in which the display device 400 is authenticated and format information for each display is extracted by another identifier instead of the MAC address.

The transmission request information is described as including an ID and a password. However, aspects of the present invention are applicable to the case in which only the MAC address is included in the transmission request information. In this case, if the display device 400 receives transmission request information including only the MAC address and the display device 400 has not been authenticated, the server should be adapted to transmit a message requesting an ID and a password to the display device 400 to perform an additional authenticating procedure.

Also, as described above, the ID and the password are all received for authentication procedure. However, aspects of the present invention are applicable to the case in which either one of the ID and the password is used for authentication or another identifier is used for authentication. For example, the display device 400 may be authenticated by the MAC address.

Although in the above embodiments the format information is extracted based on the transmission request information, aspects of the present invention are also applicable to the case in which information other than the format information is additionally extracted based on the transmission request information and is used for another purpose instead of format conversion. For example, if transmission request information is received from two or more devices, the server extracts priority information for each device based on the transmission request information received from each device, and processes an image according to the extracted priority information and transmits the image.

The server 300 may store data about a name of a device which tries to request the server 300 to transmit an image and a request trial time, and process an image according to a priority based on the stored data and transmits the image.

As described above, the format information for each device is pre-stored in the server 300. However, this is merely an example for the convenience of explanation. Accordingly, aspects of the present invention are applicable to the case in which the transmission request information transmitted from the display device 400 includes format information for the display device 400 and the server 300 processes an image using the format information included in the transmission request information received from the display device 400.

The display device 400 is illustrated above as a device for receiving a processed image. However, this display device 400 does not necessarily receive and display a processed image. Aspects of the present invention may also employ devices that receive the processed images and do not include a display.

According to an example embodiment of the present invention, an image stored in a format not supported by an external device can be received in a format supportable by the external device, and accordingly, the external device does not waste a resource required to process data and is provided with an image optimized for display.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. An image providing apparatus comprising:
a storage unit to store format information about a plurality of display devices;
a transceiver to receive transmission request information for at least one image stored in at least one image storage device from at least one display device; and
a controller to extract format information about the display device from the stored format information about the display devices based on the transmission request information, convert a format of the image stored in the image storage device using the extracted format information, and transmit the format-converted image to the display device via the transceiver for display of the format-converted image on the display device,
wherein the transmission request information includes a request for the image stored in the image storage device, and identification information about the display device, and
wherein the controller extracts the format information about the display device from the format information about the display devices based on the request for the image stored in the image storage device and the identification information about the display device,
wherein the controller extracts information about whether the display device has already been authenticated along with the format information, and if the display device has already been authenticated, the controller converts the format of the image using identification information about the display device included in the transmission request information,
wherein, if the display device has not been authenticated, the controller determines whether to authenticate the display device using at least one of a user identifier and a password included in the transmission request information, and if the display device has been authenticated, the controller converts the format of the image using identification information about the display device included in the transmission request information, and
wherein the controller transmits a user interface (UI) optimized for the display device along with the format-converted image to the display device such that the format-converted image and the UI are displayed on a screen of the display device.

2. The image providing apparatus as claimed in claim 1, wherein the image storage device stores the image photographed by at least one photographing apparatus.

3. The image providing apparatus as claimed in claim 1, wherein the transmission request information further includes at least one of a user identifier and a password.

4. The image providing apparatus as claimed in claim 1, wherein the format information includes quality or property information about an image supported by at least one of the display devices.

5. The image providing apparatus as claimed in claim 4, wherein the controller is configured to convert the format of the image received from the image storage device using the extracted format information about the display device so that the format-converted image complies with the extracted format information of about the display device, and
wherein the format information comprises at least one of a frame rate, a compression method and a resolution.

6. The image providing apparatus as claimed in claim 1, wherein, if a manipulation command input through the UI is received, the controller re-processes the image stored in the image storage device to the converted format, according to the manipulation command, and transmits the re-processed image to the display device in a wireless manner via the transceiver.

7. The image providing apparatus as claimed in claim 1, wherein the image stored in the image storage device comprises a plurality of images, and
wherein the controller controls the image storage device such that the plurality of images, which are format-converted, are concurrently displayed on the display device.

8. An image displaying apparatus comprising:
a transceiver to transmit to a server transmission request information for at least one image stored in at least one image storage device, and receive from the server the image having a converted format by the server based on the transmission request information; and
a controller to control the image displaying apparatus such that the format-converted image is displayed,
wherein the transmission request information includes a request for the image stored in the at least one image storage device, and identification information about the image displaying apparatus,
wherein the server stores format information about a plurality of display devices, extracts formation information about the image displaying apparatus, corresponding to the converted format, from the stored format information about the display devices based on the request for the image stored in the image storage device and the identification information about the image displaying apparatus, and converts the format of the image using the extracted format information,
wherein the server extracts information about whether the image displaying apparatus has already been authenticated along with the format information, and if the display device has already been authenticated, the server converts the format of the image using identification information about the image displaying apparatus included in the transmission request information,
wherein, if the image displaying apparatus has not been authenticated, the server determines whether to authenticate the image displaying apparatus using at least one of a user identifier and a password included in the transmission request information, and if the image displaying apparatus has been authenticated, the server converts the format of the image using identification information about the image displaying apparatus included in the transmission request information, and
wherein the transceiver receives the format-converted image along with a user interface (UI) optimized for the image displaying apparatus from the server.

9. The image displaying apparatus as claimed in claim 8, further comprising a user input unit to manipulate the UI;
wherein, if a manipulation command for the UI is input through the user input unit, the transceiver transmits the manipulation command to the server and receives an image which is re-processed to the converted format, by the server according to the manipulation command.

10. The image displaying apparatus as claimed in claim 8, wherein the format-converted image is an image processed to comply with the extracted format information supported by the image displaying apparatus, and
wherein the format information comprises at least one of a frame rate, a compression method and a resolution.

11. The image displaying apparatus as claimed in claim 8, wherein the format-converted image includes an image combining a plurality of images stored in a plurality of image storage devices including the image storage device.

12. An image transmitting method by an image providing apparatus, the method comprising:
receiving transmission request information for at least one image stored in at least one image storage device from at least one display device;
extracting format information about the display device from pre-stored format information about a plurality of display devices based on the received transmission request information;
converting a format of the image stored in the image storage device using the extracted format information; and
transmitting the format-converted image to the display device for display of the format-converted image on the display device,
wherein the transmission request information includes a request for the image stored in the image storage device, and identification information about the display device,
wherein the extracting format information comprises extracting the format information about the display device from the format information about the display devices based on the request for the image stored in the image storage device and the identification information of the display device,
wherein the transmitting the format-converted image comprises transmitting the format-converted image along with a user interface (UI) optimized for the display device such that the format-converted image and the UI are displayed on a screen of the display device, and
wherein the converting the format of the image comprises:
extracting information about whether the display device has already been authenticated, along with the format information, and if the display device has been already authenticated, converting the format of the image using identification information about the display device included in the transmission request information; and
if the display device has not been already authenticated, determining whether to authenticate the display device using at least one of a user identifier and a password included in the transmission request information, and if the display device has been authenticated, converting the format of the image using identification information about the display device included in the transmission request information.

13. The image transmitting method as claimed in claim 12, wherein the converting the format of the image comprises converting the format of the image so that the format-converted image complies with the extracted format information about the display device, and wherein the format information comprises at least one of a frame rate, a compression method and a resolution.

14. The image transmitting method as claimed in claim 12, further comprising, if a manipulation command input through the UI is received, re-processing the image stored in the image storage device to the converted format, according to the manipulation command, and re-transmitting the re-processed image to the display device in a wireless manner.

15. The image transmitting method as claimed in claim 12, wherein the image stored in the image storage device comprises a plurality of images, and wherein the method further comprises:
converting formats of the plurality of images stored in the plurality of the image storing devices; and
transmitting the plurality of format-converted images to the display device for displaying the plurality of format-converted images on a screen of the display device concurrently.

16. An image transmitting system, comprising:
at least one image storage device to store at least one image photographed by at least one photographing apparatus;
at least one display device to transmit transmission request information for at least one image stored in the image storage device to receive the image stored in the image storage device; and
a server to extract format information about the display device from pre-stored format information about a plurality of display devices based on the transmission request information, if the transmission request information is received, convert a format of the image stored in the image storage device using the extracted format information, and transmit the format-converted image to the display device for display of the format-converted image on the display device, wherein the transmission request information includes a request for the image stored in the image storage device, and identification information about the display device, wherein the server extracts the format information about the display device from the pre-stored format information about the display devices based on the request for the image stored in the image storage device and the identification information about the display device, wherein the server extracts information about whether the image displaying apparatus has already been authenticated along with the format information, and if the display device has already been authenticated, the server converts the format of the image using identification information about the image displaying apparatus included in the transmission request information, and wherein, if the image displaying apparatus has not been authenticated, the server determines whether to authenticate the image displaying apparatus using at least one of a user identifier and a password included in the transmission request information, and if the image displaying apparatus has been authenticated, the server converts the format of the image using identification information about the image displaying apparatus included in the transmission request information.

17. The image transmitting system as claimed in claim 16, wherein, if the transmission request information is received from the display device, the server converts the format of the image so that the format-converted image complies with the extracted format information supported by the display device, and transmits the format-converted image to the display device.

18. The image transmitting system as claimed in claim 16, wherein the format information comprises at least one of a frame rate, a compression method and a resolution.

19. The image transmitting system as claimed in claim 16, wherein, if a plurality of display devices transmit transmission requests concurrently, the server converts the stored image to different formats according to a predefined priority and wirelessly transmits the image.

* * * * *